United States Patent
Huang et al.

(10) Patent No.: US 7,401,737 B2
(45) Date of Patent: Jul. 22, 2008

(54) APPARATUS AND METHOD FOR A MOBILE PERSONAL COMPUTER SYSTEM (MPC) WITH A BUILT-IN SCANNER

(75) Inventors: Xiaobo Huang, Shanghai (CN); Wen Wei, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/437,101

(22) Filed: May 19, 2006

(65) Prior Publication Data

US 2007/0228138 A1    Oct. 4, 2007

(51) Int. Cl.
*G06K 7/14* (2006.01)
(52) U.S. Cl. .................... 235/454; 235/470
(58) Field of Classification Search ............. 235/454, 235/472.01, 470
See application file for complete search history.

(56) References Cited

U.S. PATENT DOCUMENTS

| | | | | |
|---|---|---|---|---|
| 6,064,779 | A * | 5/2000 | Neukermans et al. | 382/313 |
| 6,115,241 | A | 9/2000 | Hu | |
| 6,504,138 | B1 * | 1/2003 | Mangerson | 250/208.1 |
| 6,891,979 | B2 * | 5/2005 | Hu et al. | 382/313 |
| 6,978,933 | B2 * | 12/2005 | Yap et al. | 235/451 |
| 7,076,271 | B2 * | 7/2006 | Ban et al. | 455/556.1 |
| 2004/0181749 | A1 * | 9/2004 | Chellapilla et al. | 715/505 |
| 2004/0182935 | A1 * | 9/2004 | Russell et al. | 235/472.01 |
| 2006/0103893 | A1 * | 5/2006 | Azimi et al. | 358/474 |
| 2006/0176524 | A1 * | 8/2006 | Willrich | 358/474 |
| 2006/0221409 | A1 * | 10/2006 | Cohen et al. | 358/462 |

FOREIGN PATENT DOCUMENTS

EP    0411698    2/1991

OTHER PUBLICATIONS

Hotcard Technology—A8 Scanner specifications, 1 page, no date.
Hotcard Technology PTE Ltd., Business Card Reader (BCR) software PC version (version 2.5), 3 pages, no date.
PCT Search Report for WO 2007/109924 (issued on Jan. 18, 2007).

* cited by examiner

*Primary Examiner*—Michael G. Lee
*Assistant Examiner*—Paultep Savusdiphol
(74) *Attorney, Agent, or Firm*—Blakely, Sokoloff, Taylor & Zafman LLP (57) ABSTRACT

A method and apparatus for a mobile personal computer (MPC) system with built-in scanner. In one embodiment, the method includes detection of the insertion of an item within a paper feed tail exposed on an exterior surface of the MPC system. In one embodiment, if insertion is detected when the MPC system is in a sleep state, a disabled scanner device is enabled to scan the item to capture an item image. Subsequently, the item image may be processed to identify the item as, for example, a business card. In one embodiment, an item image may be further processed to extract contact information from the item image. In one embodiment, when item insertion is performed during a sleep state, subsequent to completion of extraction of the contact information, components of the system awoken during the sleep state may resume the sleep state. Other embodiments are described and claimed.

20 Claims, 10 Drawing Sheets

APPARATUS AND METHOD FOR A MOBILE PERSONAL COMPUTER SYSTEM (MPC) WITH A BUILT-IN SCANNER

RELATED APPLICATION

The present patent application is a non-provisional application of and claims priority to International Application No. PCT/CN2006/000546, filed Mar. 29, 2006, currently pending.

FIELD

One or more embodiments relate generally to the field of integrated circuit and mobile computer system design. More particularly, one or more of the embodiments relate to a method and apparatus for a mobile personal computer (MPC) with built-in scanner.

BACKGROUND

A small to medium business (SMB) user spends a great deal of time on the road traveling from various business meetings, client sites or other gatherings. Although an SMB user may work out of a certain location, the laptop/notebook computer that an SMB user takes out onto the road represents a mobile office for the SMB user. The mobile office represented by the laptop/notebook computer is required to facilitate SMB user activities while on the road.

Maintaining contact information for potential customers while out on the road represents a substantial dilemma for SMB users. It is particularly difficult for SMB users to store and carry business cards for their customers. Such contact information from business cards is critical to the SMB users' business when traveling. It is often difficult for the SMB user to type in all business cards into their mobile office computers that are collected while traveling. As a result, important contact information may eventually be lost.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for a mobile personal computer (MPC) system with built-in scanner are described. In one embodiment, the method includes the detection of the insertion of an item within a paper feed tail exposed on an exterior surface of the MPC system. In one embodiment, insertion may be detected when the MPC system is operating according to a sleep state. In accordance with such an embodiment, a scanner device may be enabled, which is disabled based on the sleep state. Once detected, the item may be scanned to capture an item image. Subsequently, the item image may be processed to identify the item as, such as, for example, a business card.

In one embodiment, an item image may be further processed to extract customer information from the item image, including a business name, contact name, business address, contact telephone number information, as well as e-mail contact information. Such information may be stored within the contact database. In one embodiment, when item insertion is performed during a sleep state to conserve, for example, a battery lifetime of MPC system, subsequent to completion of extraction of the contact information, components of the system awoken during the sleep state and may resume the sleep state.

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
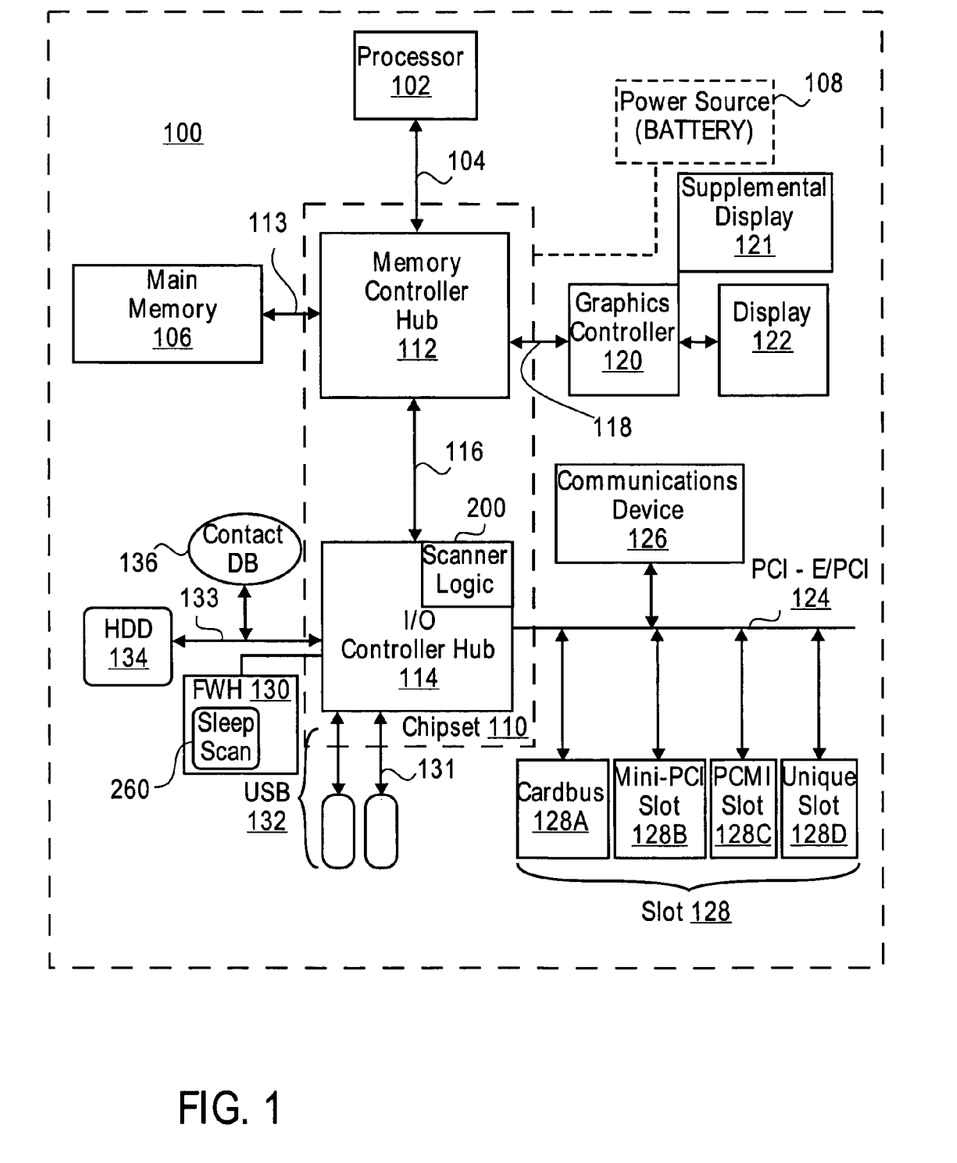
FIG. 1 is a block diagram illustrating a mobile platform computer system including scanner logic to enable a cordless mechanism to capture contact information, in accordance with one embodiment.

FIG. 1 is a block diagram illustrating mobile personal computer (PC) (MPC) system 100 including a built-in scanner logic 200 to enable a cordless mechanism to capture contact information from business cards within MPC system 100, in accordance with one embodiment. As described herein, MPC systems may include, but are not limited to laptop computers, notebook computers, handheld devices (e.g., personal digital assistants, cell phones, etc.) or other like battery powered devices. Representatively, MPC system 100 comprises an interconnect 104 for communicating information between processor (CPU) 102 and chipset 110. In one embodiment, CPU 102 may be a multi-core processor to provide a symmetric multiprocessor system (SMP) or asymmetric multiprocessor system (AMP). As described herein, the term "chipset" is used in a manner to collectively describe the various devices coupled to CPU 102 to perform desired system functionality.

Representatively, chipset 110 may include memory controller hub 112 (MCH) coupled to graphics controller 120 via interconnect 118. In one embodiment, graphics controller 120 couples primary display 122 and supplemental display 121 to MCH 112. In an alternative embodiment, graphics controller 120 is integrated into MCH 112, such that, in one embodiment, MCH 112 operates as an integrated graphics MCH (GMCH). Representatively, MCH 112 is also coupled to main memory 106 via interconnect 113. In one embodiment, main memory 106 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 110 includes an input/output (I/O) controller hub (ICH) 114, coupled to MCH 112 via interconnect 116. Representatively, ICH 114 may include a universal serial bus (USB) link or interconnect 131 to couple one or more USB slots 132 to ICH 114. Likewise, a serial advance technology attachment (SATA) 133 may couple hard disk drive devices (HDD) 134 and contact database (DB) 136 to ICH 114. Although chipset 110 is illustrated as including a separate MCH 112 and ICH 114, in one embodiment, MCH 112 may be integrated within CPU 102. In an alternate embodiment, the functionality of MCH 112 and ICH 114 are integrated within chipset 110.

In one embodiment, ICH 114 controls the operation of HDD 134, contact DB 136, USBs 132, and the Peripheral Component Interconnect (PCI), PCI Express (PCI-E) or other follow on point-to-point link 124. The PCI/PCI-E interconnect 124 can be used to connect a communications device 126, such as a modem or wireless receiver, to the mobile PC system 100. In one embodiment, communication device 126 may operate as a wireless communication device 126 according to a wireless network protocol, such as, for example, the Institute of Electronic Engineers (IEEE) 802.11 Standard (e.g., IEEE Std. 802.11-1997, 802.11a, 802.11e, 802.11n, etc.).

In one embodiment, wireless communications device may operate according to an 802.11 Standard for providing a mobile user with a connection to a local area network (LAN) through an radio frequency (RF) connection. However, it should be recognized that access to a wireless local area network (WLAN) is not limited to the 802.11 Standard, but may include Hyper-Lan2, as well as future potential standards for any point-to-point wireless link or network. In one embodiment, wireless communication device 126 may provide support for a wireless network protocol for connection to a wireless wide area network (WWAN).

In one embodiment, the PCI/PCI-E interconnect 124 can provide various slots 128 that allow add-in modules to be connected to the MPC system 100. For example, a slot 128 can include a Cardbus 128A, a Mini-PCI Slot 128B, a Personal Computer Memory Card International Association (PCMCIA) Slot 128C designed to receive PC-Cards, or any unique or proprietary slot 128D either now in existence or developed in the future. In one embodiment, a PCI root port (not shown) may be provided to couple slots 128 to ICH 114 via PCI-E interconnect 124.

Representatively, computer system 100 further includes non-volatile (e.g., Flash) memory 130. In one embodiment, flash memory 150 may be referred to as a "firmware hub" or FWH, which may include a basic input/output system (BIOS) to initialize computer system 100. In one embodiment, initialization FWH 130 includes sleep scan code 260 for initialization and operation of scanner logic 200 to enable a cordless mechanism to capture contact information from business cards within MPC system 100, according to one embodiment.

Figure 2:
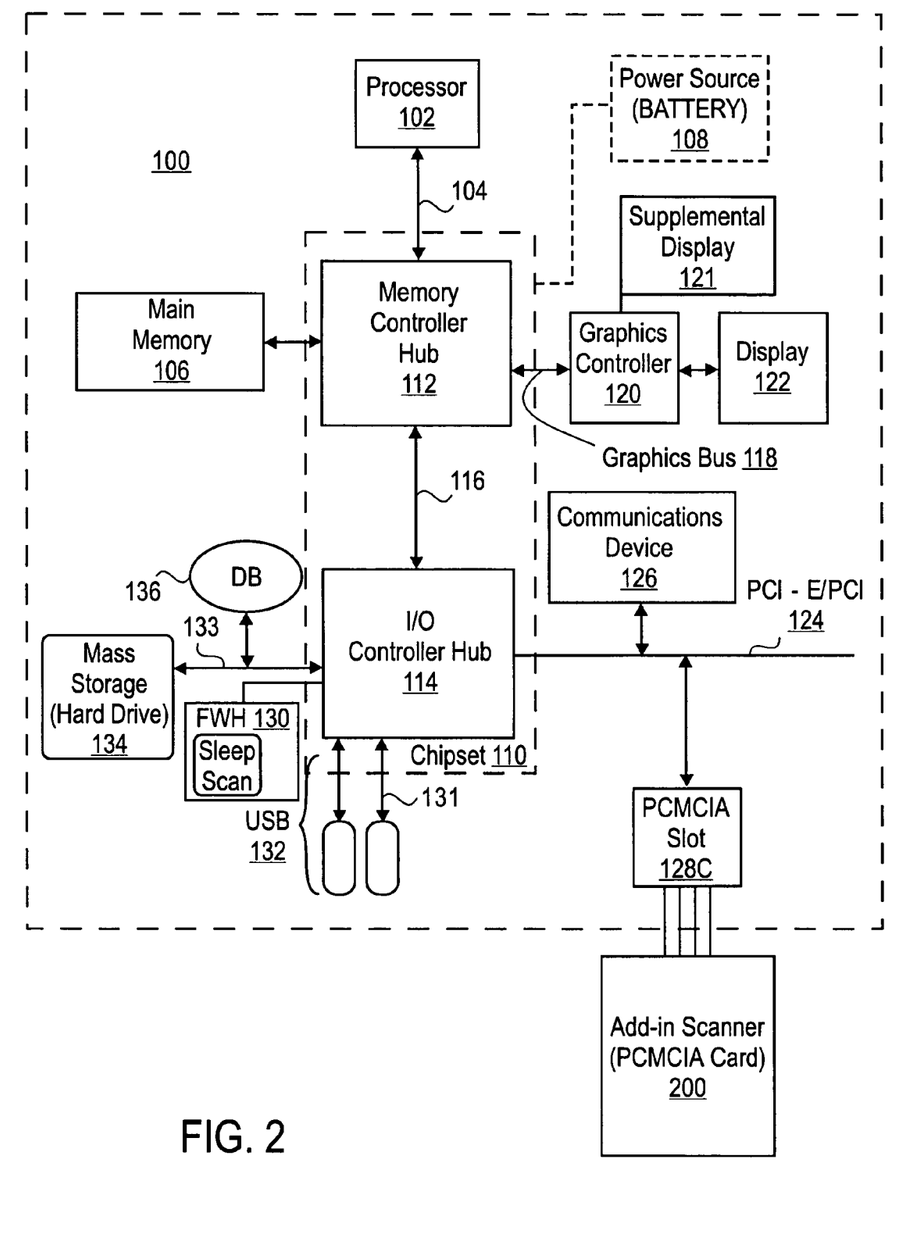
FIG. 2 is a block diagram further illustrating the mobile personal computer system of FIG. 1, wherein the scanner logic is provided as an add-in card to enable a cordless mechanism for capture of contact information, according to one embodiment.
Figure 3:
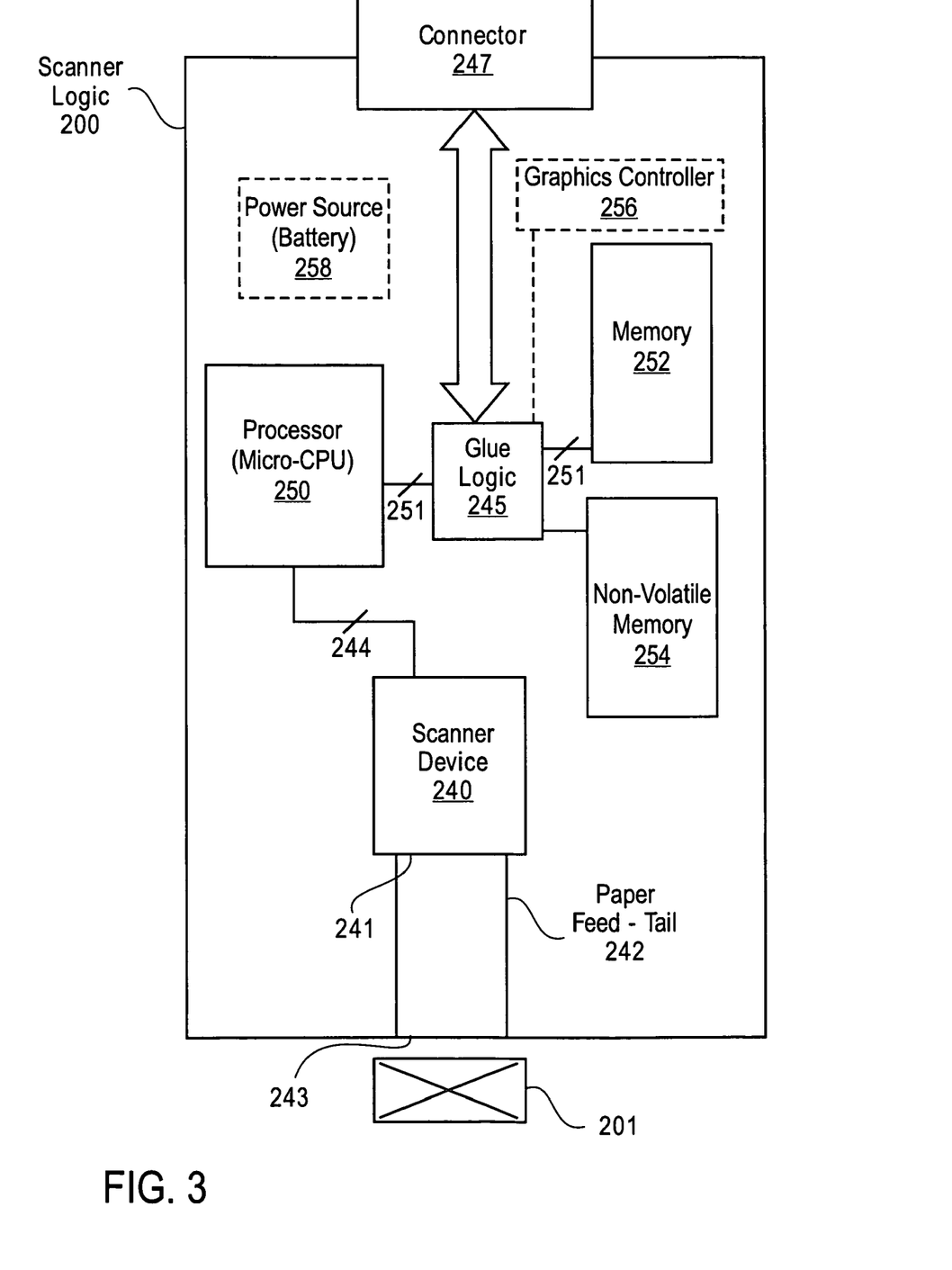
FIG. 3 is a block diagram further illustrating scanner logic of FIGS. 1 and 2, according to one embodiment.

FIG. 2 further illustrates MPC system 100, including scanner logic 200 provided on an add-in card 200, such as, for example, a PCMCIA card to coupled to PCMCIA slot 28C, according to one embodiment. In one embodiment, scanner logic 200 may be implemented within computer systems including an MCH integrated within a CPU, an MCH and ICH integrated within a chipset, as well as a system on-chip. Accordingly, those skilled in the art recognize that FIGS. 1 and 3 are provided to illustrate possible embodiments and should not be construed in a limiting manner.

Several embodiments of the scanner logic 200 are described with reference to FIG. 3. In one embodiment, the components of the scanner logic 200 are communicatively connected by a glue logic 245. The scanner logic 200 can include paper feed tail 242 including a proximate end 241 coupled to scanner device 240 and a distal end 243 exposed on an outer surface of an MPC system, such as MPC system 100 of FIGS. 1 and 2. These elements of scanner logic 200 provide a cordless mechanism to capture contact information from business cards within MPC system 100. Processor 250 may perform any necessary signal processing.

The processor 250 can be a micro-controller, such as a Micro-CPU, an embedded processor or other capable DSP. The processor 250 can perform the signal and data processing needed to carry out the operations of the scanner logic 200 discussed further below. In one embodiment, processor 250 may perform identification of an item image 244 generated by scanner device 240 from item 201 received from proximate end 241 of paper feed tail 242. In one embodiment, operating system and software code for the processor 250 can be stored in non-volatile memory 254. The non-volatile memory can be a FLASH memory, a ROM, or other battery-backed or otherwise non-volatile memory.

When an item 201, such as a business card, is inserted at an exposed, distal end 243 of paper feed tail 242, scanner device 240 captures an item image 244 that is provided to processor 250, to enable extraction of customer information 251 from item image 244, which may be stored in memory 252. Memory 252 can be a RAM or other fast memory. During operation, the operating system and software code stored in the non-volatile memory 254 can be transferred to the memory 252 for fast access. Similarly, the data stored in the memory 252 can be periodically backed up, or transferred to the non-volatile memory 254 for more secure storage.

As shown in FIG. 1, scanner logic 200 connects to the mobile PC 100 using a connector 247. In addition to providing a connection to the mobile PC 100, the connector 247 may also provide access to the power supply, such as the battery, of the MPC system 100. In this case, the MPC system 100 can provide power to the scanner logic 200. In another embodiment, the scanner logic 200 can have its own power source 258, such as a battery, located on the scanner logic 200. If the scanner logic 200 includes a power source 258, then this power source may recharge itself using the power supply of the MPC system 100. In one embodiment, the scanner logic 200 can also include a graphics controller 256 to operate a supplemental display 121 of MPC system 100 to illustrate customer information 251.

Mobile computing systems, such as MPC system 100, laptop computers, notebook computers, handheld devices (e.g., personal digital assistants, cell phones, etc.) are often battery powered; and, as such, power consumption is a matter of concern. Typically, the less power consumed by a mobile computing system, the longer the life of the battery that powers the computing system. Often, mobile computing systems are built with a "standby mode" and/or a "hibernation mode," which are collectively referred to herein as "sleep modes/states." Either of these modes substantially shut down the activity of the computing system so that battery power is conserved.

In "standby mode," the computing system's "appendages" outside processor core 102 (e.g., its display unit 122, wireless communications device 126, HDD 134) are shut down, while volatile memory within processing core 102 (e.g., external cache (not shown) system memory 106, etc.) is kept awake (e.g., by continuing to clock/refresh and/or otherwise apply power to external cache and system memory 106). In one embodiment, CPU 102 may also shut down various internal units so that the processing of application software effectively ceases. Standby mode allows the system to conserve battery power consumption (because of the shut down of the appendages and internal CPU units) and also allows the computing system to rapidly awake because its volatile memory was not shut down.

In "hibernation mode," the contents of the volatile memory (e.g., cache system memory 106) are first stored to non-volatile memory (e.g., HDD 134); and then, the entire system is effectively shut down. Here, typically, greater power savings are realized as compared to the sleep mode because the volatile memory units are shut down. However, it takes longer for the system to return from hibernation mode to its original, normal, active state because the "state" of the system software at the time hibernation mode was entered (as represented by the matter that was transferred from volatile to non-volatile memory) needs to be "reloaded" back into volatile memory (e.g., by reading the state data from the disk drive and re-storing it back to its original locations in cache and system memory 106.)

Unfortunately, during either standby mode or hibernation mode, the utility of a mobile computing system is effectively non-existent because the CPU (being shut down) lacks the ability to execute a variety of instructions. That is, useful software routines (such as, e-mail retrieval, downloading information from the Internet, etc.) cannot be executed. In one embodiment, scanner logic 200 enable a cordless mechanism to capture contact information from business cards within MPC system 100 for MPC system. As described herein, "contact information" may refer to relevant information including company name, customer name, customer address information, e-mail, telephone information and any other like information.

Figure 4:
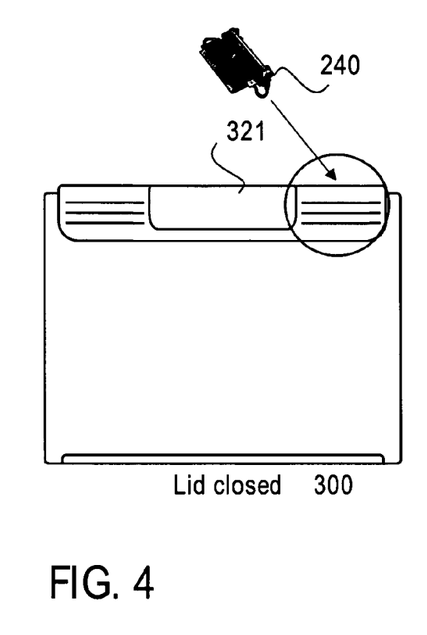
FIG. 4 is a block diagram illustrating a mobile platform computer system, including a built-in scanner module, according to one embodiment.
Figure 5:
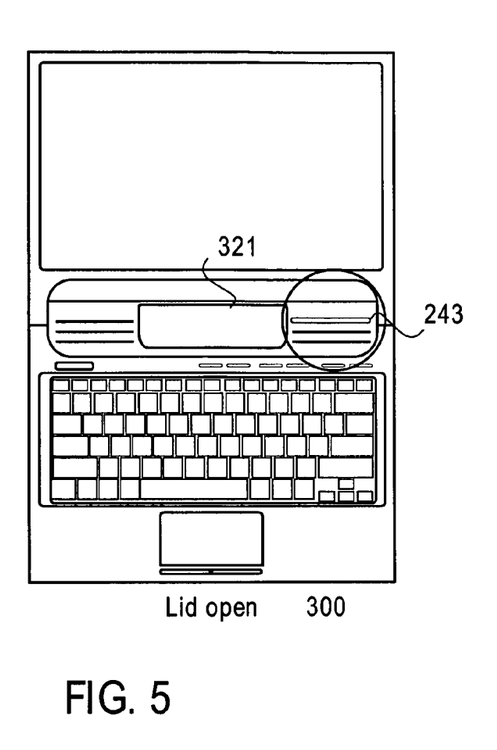
FIG. 5 is a block diagram further illustrating the mobile platform computer system of FIG. 4 with a lid of the mobile platform computer system in an open configuration, according to one embodiment.

FIGS. 4 and 5 illustrate a notebook/laptop 300, including built-in scanner logic 200 to enable a cordless mechanism to capture contact information from business cards, according to one embodiment. Representatively, FIG. 4 illustrates notebook/laptop 300, where a lid of notebook/laptop 300 is closed. In the closed configuration, a distal end 241 of paper feed tail 242 of scanner logic 200 is exposed on an exterior surface of notebook/laptop 300. As shown in FIG. 5, paper feed tail 242 of scanner logic 200 is available to a user, whether notebook/laptop 300 is in an open lid configuration, as shown in FIG. 5, or a closed lid configuration, as shown in FIG. 4. In one embodiment, secondary display 321 displays contact information extracted from a business card, which is inserted into exposed, distal end 241 of paper feed tail 242.

Figure 6:
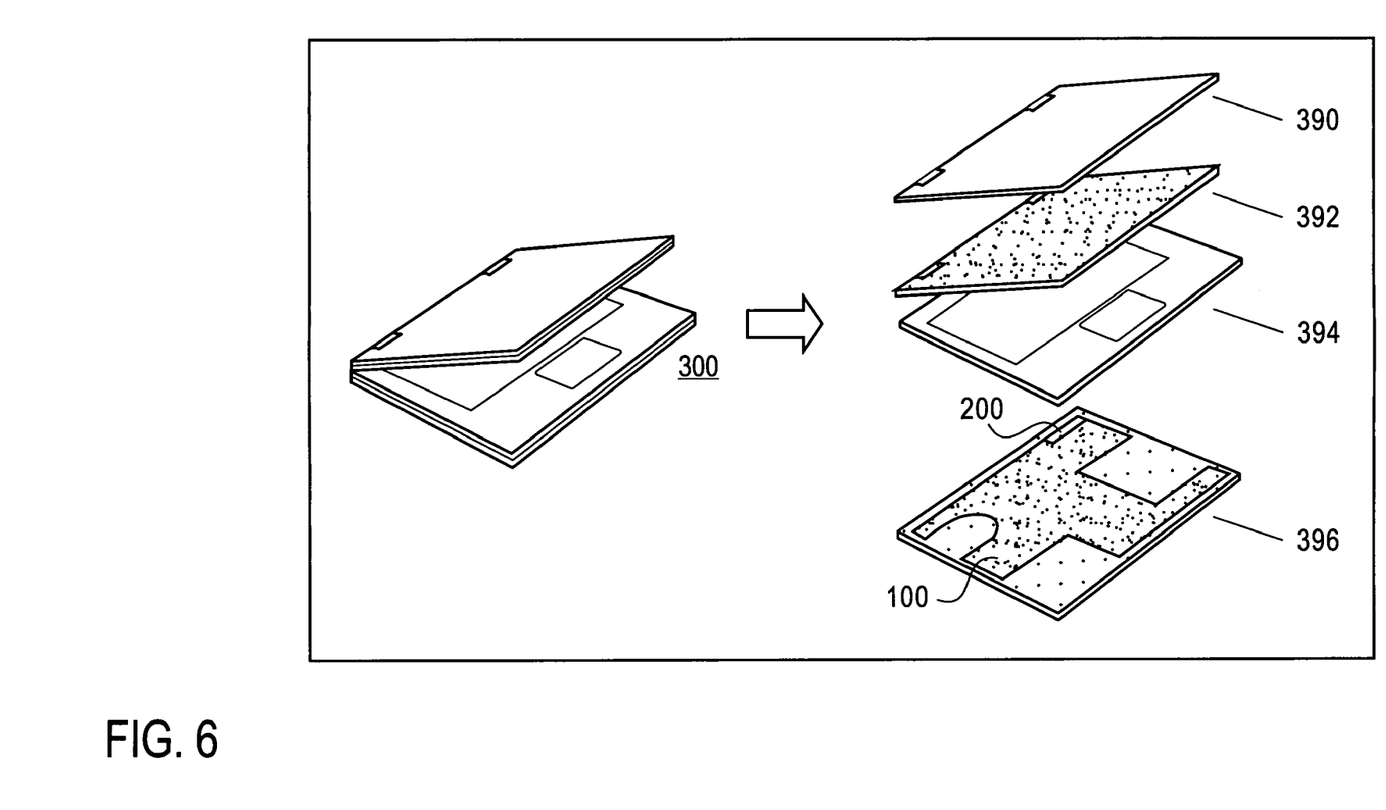
FIG. 6 is a block diagram further illustrating the mobile platform computer system of FIG. 1 including a built-in D part scanner module, according to one embodiment.

FIG. 6 is a block diagram further illustrating the mobile platform computer system 100 of FIG. 1 including a built-in D part scanner module 200, according to one embodiment. Representatively, scanner module 200 is built inside a laptop D part 396. As known to those skilled in the art, terminology regarding laptop A/B/C/D parts is interpreted as follows. Representatively, "laptop A/B parts" 390 and 392 make up an upper portion, or lid portion, of the laptop, whereas "laptop C and D parts" 394 and 396 make up the lower portion of the laptop 300, as shown in FIG. 6.

Representatively, FIG. 6 illustrates scanner module 200 formed on a motherboard, such as, for example, MPC system 100, as shown in FIG. 1. In the embodiment illustrated, scanner module is built into a notebook by mounting the module onto the motherboard 100. As shown in FIG. 6, motherboard 100 is built into D part 396 of laptop 300. Accordingly, as described herein, scanner module may be referred to as "built-in D part scanner module 200."

Referring again to FIGS. 4 and 5, in one embodiment, built-in scanner module 200 may have a form factor of 7.2 meters×3 cm×1 cm to function as a business card reader by receiving a card inserted into distal, exposed portion 243 of paper feed tail 242. As shown in FIGS. 4 and 5, access to paper feed tail 242 is available whether notebook/laptop 300 is in the closed configuration, shown in FIG. 4, or the open configuration, shown in FIG. 5. Representatively, the uniform, form factor design of built-in scan module 200 maintains unity of aesthetics with the laptops main body. In one embodiment, paper feed tail may be angled (e.g. 35°-45° adjustable) for easy operation. In one embodiment, for example, an SMB user need only perform one motion of inserting the business card to enable a cordless mechanism to capture contact information from business cards within MPC system 100, according to one embodiment.

Figure 7:
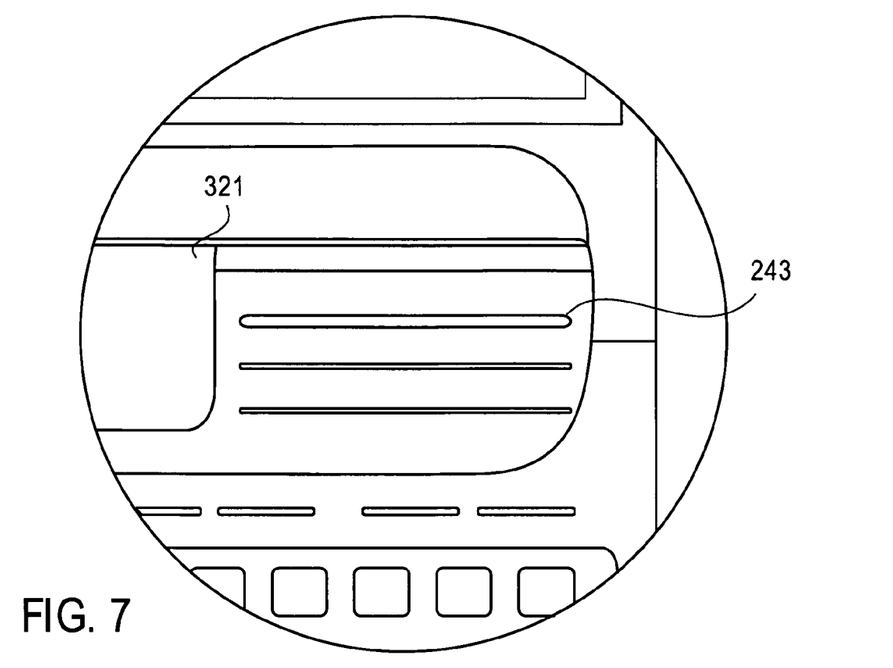
FIG. 7 is a block diagram further illustrating the built-in scanner logic of FIGS. 4 and 5, according to one embodiment.
Figure 8:
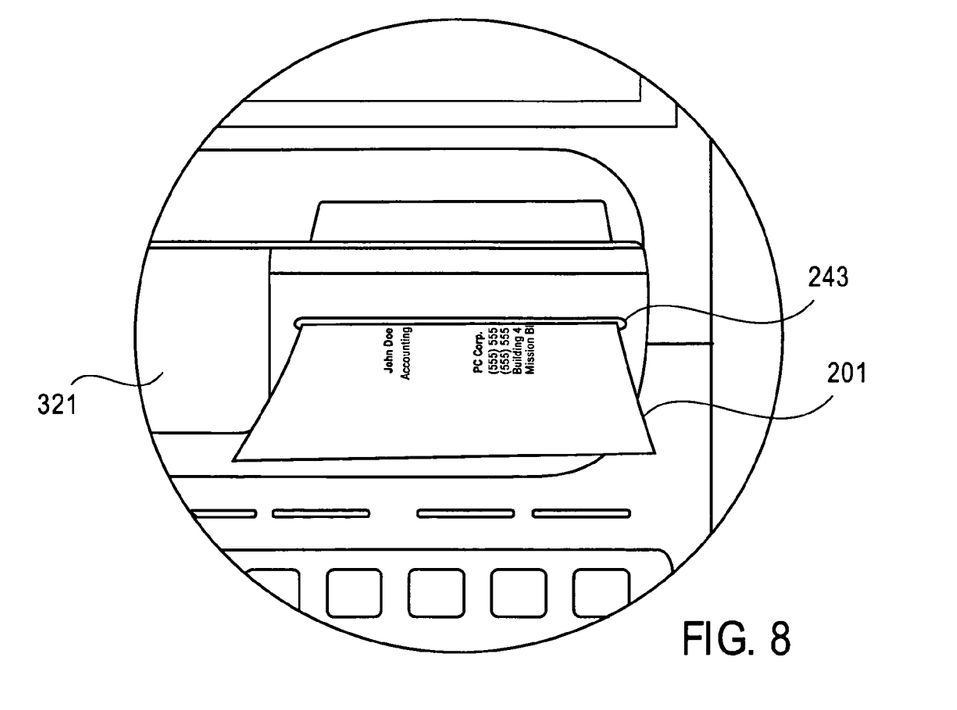
FIG. 8 is a block diagram further illustrating FIG. 7 to illustrate feeding of a data item within an exposed slot of the scanner module of FIG. 7, according to one embodiment.

FIGS. 7 and 8 illustrate an embodiment where the scanner module 200 includes the form factor, as described above, to operate as a card reader. As shown in FIG. 8, a single motion by an SMB user to insert a card within exposed distal portion 243 of paper feed tail 242 may result in the scanning of the card to generate an item image 244, for example, as shown in FIG. 3. According to such item image 244 identification logic, which may be performed by, for example, processor 250, as shown in FIG. 3, may extract customer information from the item image. Based on the extracted information, the information may be further configured to extract relevant information including company name, customer name, customer address information, e-mail and relevant telephone information, referred to herein as "contact information."

In one embodiment, such contact information may be stored within contact database (DB), as shown in FIGS. 1 and 2. Accordingly, for the SMB user, a single motion for insertion of a business card within paper feed tail 242 results in the scanning and automatic identification process, which may be indicated by ejection of the business card from the exposed distal portion 243 of paper feed tail 242.

Figure 9:
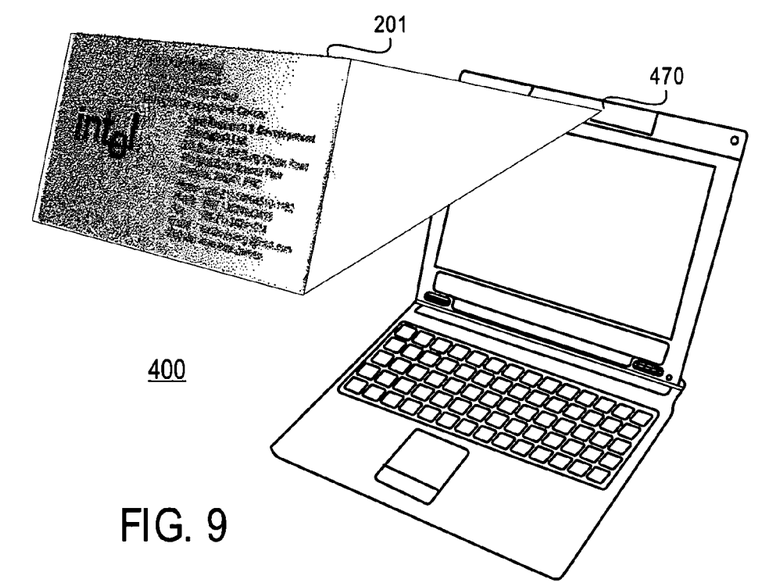
FIG. 9 is a block diagram illustrating a mobile platform computer system including a built-in camera to capture a data item, according to one embodiment.
Figure 10:
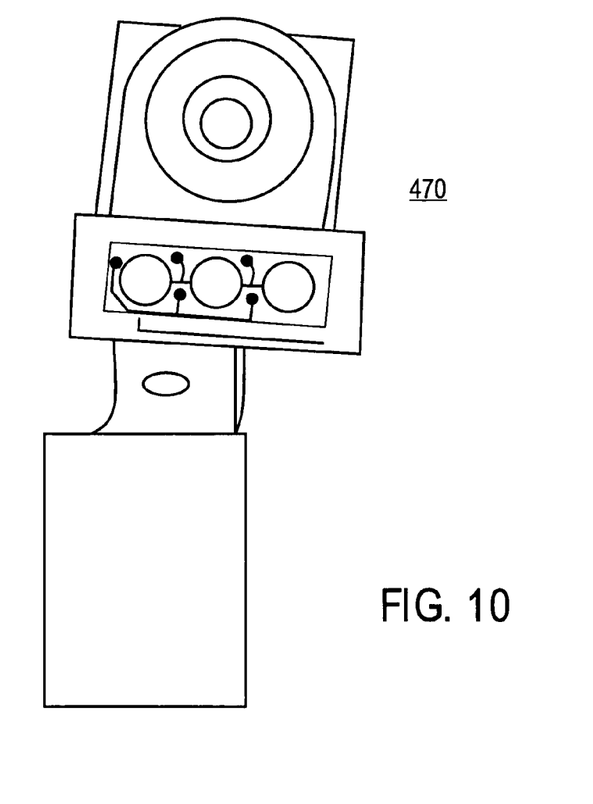
FIG. 10 is a block diagram further illustrating the built-in camera portion of FIG. 8, according to one embodiment.

FIGS. 9 and 10 illustrate a notebook/laptop computer 400 in an open lid configuration, where a laptop A/B part 390/392 includes built-in camera 470, as shown in FIG. 9. In one embodiment, built-in camera 470 requires the user to place the card in front of the camera to take an image and then performs processing of the image for storage in a business card database. As shown in FIGS. 4-10, whether the business card is captured with a scanner or a built-in camera, in one embodiment, capture of contact information may be performed when the computer is in a sleep mode, as described above.

In one embodiment, BIOS code, such as, for example, sleep scan code 260, as shown in FIGS. 1 and 2, may enable scanner module, based on the detection of an insertion of a business card within paper feed tail 242. In response, scanner module 200, as shown in FIG. 3, may generate an item image 244, which is provided at processor 250. Processor 250 then performs an identification process to extract relevant customer information 251, which may either stored in memory 252 or contact database 260, as shown in FIG. 1. In one embodiment, such customer information may be displayed within secondary display 321, while the notebook/laptop 300 remains in a sleep state, as shown in FIG. 4. In accordance with such an embodiment, entry of business card information may be performed while notebook/laptop computer remains in a sleep state to conserve battery. Procedural methods for implementing one or more embodiments are now described.

Figure 11:
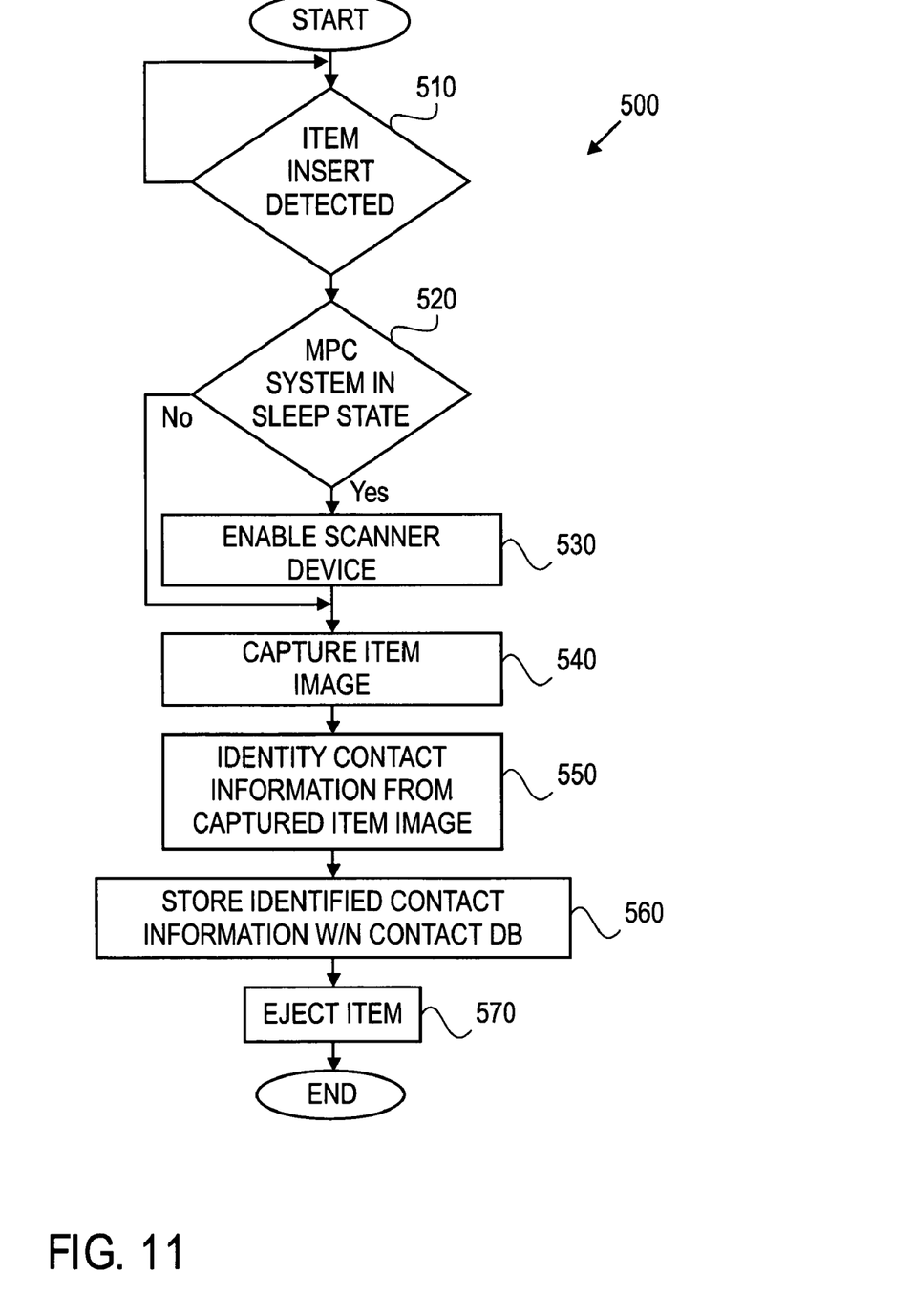
FIG. 11 is a flowchart illustrating a method for a cordless mechanism to capture contact information from a business card within a mobile platform computer system, according to one embodiment.

Turning now to FIG. 11, the particular methods associated with various embodiments are described in terms of computer software and hardware with reference to a flowchart. The methods to be performed by a computing device (e.g., a scanner module) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments are not described with reference to any particular programming language. It will be appreciated that a variety of programming languages may be used to implement embodiments as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 11 is a flowchart illustrating a method 500 for a mobile personal computer (MPC) system, in accordance with one embodiment. In the embodiments described, examples of the described embodiments will be made with reference to FIGS. 1-10. However, the described embodiments should not be limited to the examples provided to limit the scope provided by the appended claims.

Referring again to FIG. 11, at process block 510, it is determined whether item insert is detected. For example, as shown in FIG. 8, insertion of item 201 may be detected at process block 510. Once detected, at process block 520, it is determined whether the MPC system is in a sleep state, for example, as described above. If the MPC system is in a sleep state, a scanner device is enabled at process block 530. Otherwise, the scanner device remains enabled according to the normal MPC system operating mode. During operation according to the sleep state, in one embodiment, a secondary display 321, as shown in FIGS. 1, 2, 4 and 5, may be enabled to display contact information captured from the inserted item.

Referring again to FIG. 11, at process block 540, an item image is captured, for example, using either a scanner device 240, as shown in FIG. 3, or a built-in camera part 470, as shown in FIG. 10. At process block 550, contact information may be identified from the captured item image. In one embodiment, identification logic, which may be performed by, for example, processor 250 as shown in FIG. 3, may extract relevant contact information, including, but not limited to, a business name, a customer name, business address, customer telephone numbers including wire-to-wireless telephone numbers, e-mail and the like. In one embodiment, such information may be further configured and stored within a contact database at process block 560. As far as such formatting, such information may be displayed through secondary display 321 (FIGS. 4 and 5) if the MPC system is initially in a sleep state, as determined at process block 520. In one embodiment, as shown in FIG. 11, at process block 570, the item is ejected from paper feed tail to indicate that the capture of contact information is complete.

Figure 12:
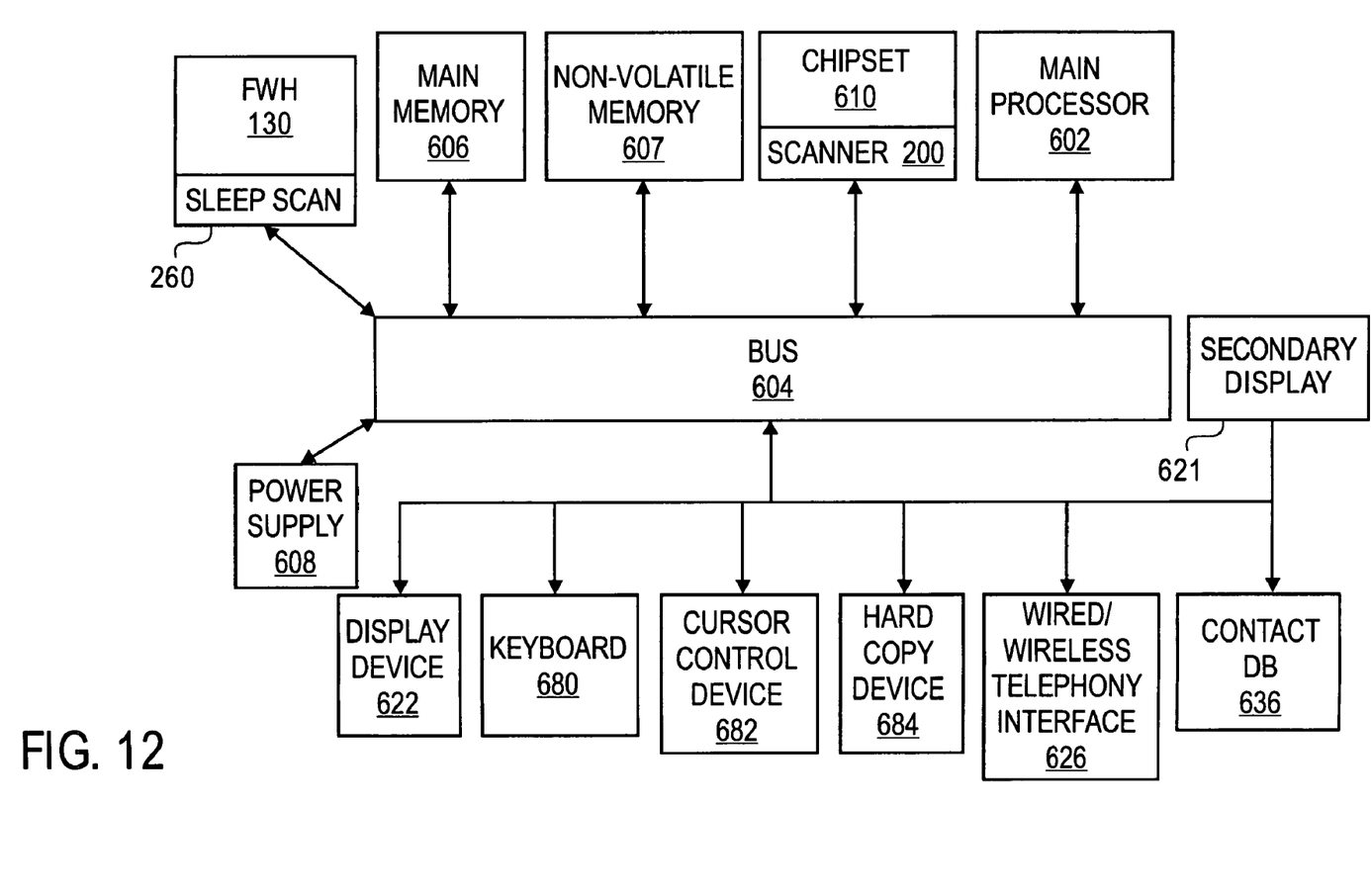
FIG. 12 is a block diagram illustrating a mobile platform architecture to provide a cordless mechanism to capture contact information, according to one embodiment.

FIG. 12 illustrates a block diagram of an example computer system 600 that may use an embodiment of scanner logic 200 to enable a cordless mechanism to capture contact information from business cards, according to one embodiment. In one embodiment, computer system 600 comprises a communication mechanism or bus 604 for communicating information, and an integrated circuit component such as a main processing unit 602 coupled with bus 604 for processing information. One or more of the components or devices in the computer system 600 such as the main processing unit 602 or a chipset 610 may use an embodiment of scanner logic 200. The main processing unit 602 may consist of one or more processor cores working together as a unit.

Computer system 600 further comprises a random access memory (RAM) or other dynamic storage device 606 (referred to as main memory) coupled to bus 604 for storing information and instructions to be executed by main processing unit 602. Main memory 606 also may be used for storing temporary variables or other intermediate information during execution of instructions by main processing unit 602.

FWH 130 may be a combination of software and hardware, such as Electronically Programmable Read-Only Memory (EPROM) that has the operations for the routine recorded on the EPROM. The FWH 130 may embed foundation code, basic input/output system code (BIOS), or other similar code. The FWH 130 may make it possible for the computer system 600 to boot itself. In one embodiment, FWH 130 includes sleep scan code 260 for initialization and operation of scanner logic 200 to enable a cordless mechanism to capture contact information from business cards.

Computer system 600 also comprises a read-only memory (ROM) and/or other static storage device 607 coupled to bus 604 for storing static information and instructions for main processing unit 602. The static storage device 607 may store OS level and application level software.

Computer system 600 may further be coupled to or have an integral display device 622, such as a cathode ray tube (CRT) or liquid crystal display (LCD), coupled to bus 604 for displaying information to a computer user. In one embodiment, secondary display 621, such as secondary display 321, shown in FIGS. 4 and 5, is also coupled to bus 604. A chipset 610 may interface with the display device 622 and secondary display 621.

An alphanumeric input device (keyboard) 680, including alphanumeric and other keys, may also be coupled to bus 604 for communicating information and command selections to main processing unit 602. An additional user input device is cursor control device 682, such as a mouse, trackball, trackpad, stylus, or cursor direction keys, coupled to bus 604 for communicating direction information and command selections to main processing unit 602, and for controlling cursor movement on a display device 622. A Chipset may interface with the input/output devices.

Another device that may be coupled to bus 604 is a power supply such as a battery and an Alternating Current adapter circuit. Furthermore, a sound recording and playback device, such as a speaker and/or microphone (not shown) may optionally be coupled to bus 604 for audio interfacing with computer system 600. Another device that may be coupled to bus 604 is a wireless communication module 626. The wireless communication module 626 may employ a Wireless Application Protocol to establish a wireless communication channel. The wireless communication module 626 may implement a wireless networking standard, such as the 802.11 Standard.

In one embodiment, the software used to facilitate the routine can be embedded onto a machine-readable medium. A machine-readable medium includes any mechanism that provides (i.e., stores and/or transmits information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Figure 13:
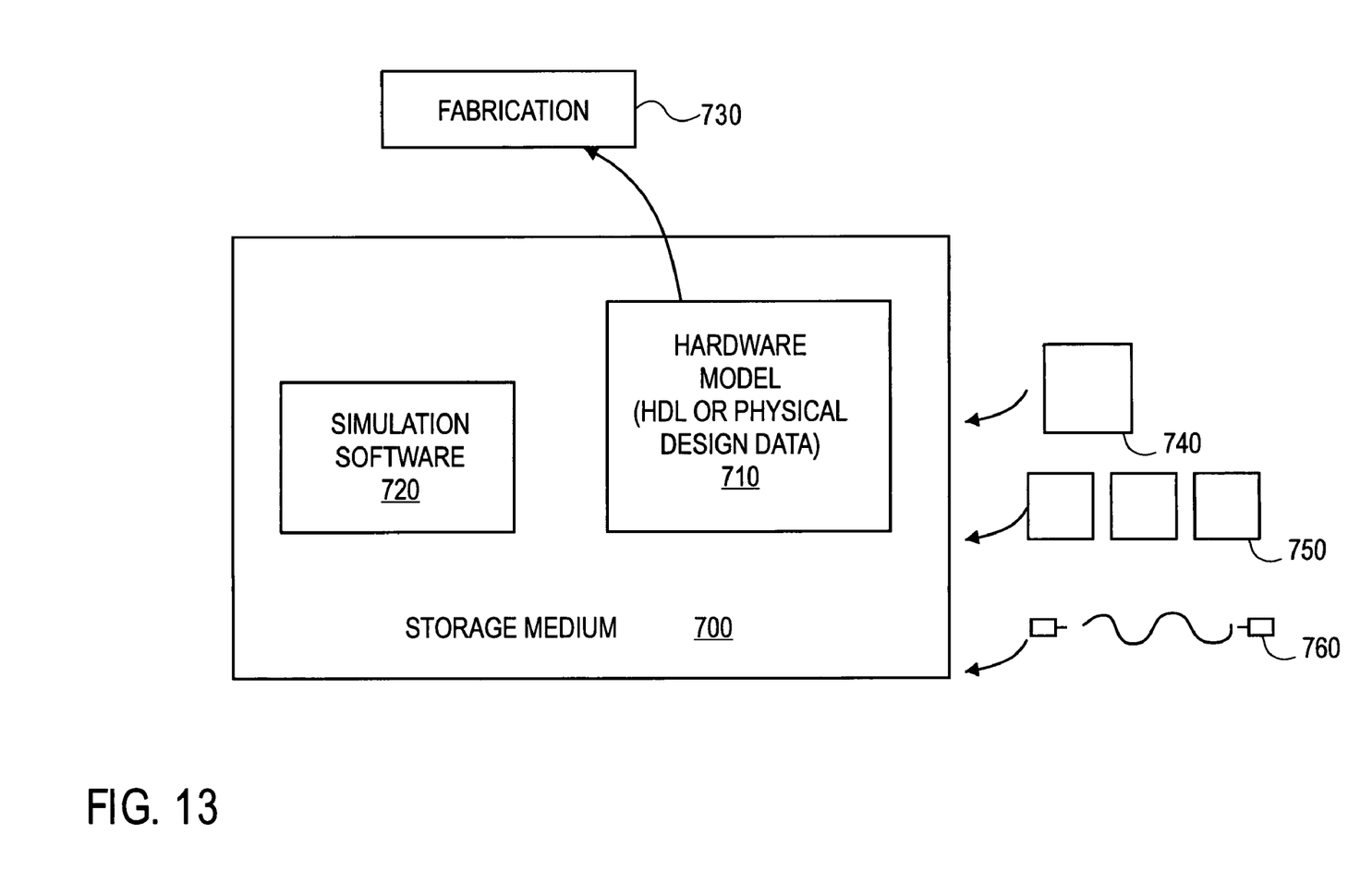
FIG. 13 is a block diagram illustrating various design representations or formats for simulation, emulation and fabrication of a design using the disclosed techniques.

FIG. 13 is a block diagram illustrating various representations or formats for simulation, emulation and fabrication 730 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite (not shown) to hardware model 710 to determine if it indeed functions as intended. In some embodiments, simulation software 720 is not recorded, captured or contained in the medium.

In any representation of the design, the data may be stored in any form of a machine readable medium. An optical or electrical wave 760 modulated or otherwise generated to transport such information, a memory 750 or a magnetic or optical storage 740, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication 730.

ALTERNATE EMBODIMENTS

It will be appreciated that, for other embodiments, a different system configuration may be used. For example, while the system 100 includes a single CPU 102, for other embodiments, a multiprocessor system (where one or more processors may be similar in configuration and operation to the CPU 102 described above) may benefit from the scanner logic 200 to enable a cordless mechanism to capture contact information from business cards of various embodiments. Further different type of system or different type of computer system such as, for example, a server, a workstation, a desktop computer system, a gaming system, an embedded computer system, a blade server, etc., may be used for other embodiments.

Elements of embodiments may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. An apparatus comprising:
   a connector to establish a connection to a chipset of a mobile platform computer (MPC) system;
   a paper feed tail having a proximate end and a distal end, the distal end exposed on an exterior surface of the MPC system, to receive an item;
   a scanner module coupled to the proximate end of the paper feed tail to receive an item fed from the proximate portion of the paper feed tail to capture an item image; and identification logic coupled to the scanner module to extract contact information from the captured item image and to store the contact information within a contact database, wherein the identification logic is further to display the captured item image on a secondary display while the MPC system is in a sleep state if the MPC system is in the sleep state during the capture of the item image.

2. The apparatus of claim 1, wherein the apparatus is directly mounted on the chipset of the mobile personal computer system.

3. The apparatus of claim 1, further comprising:
a non-volatile memory, coupled to the processor, to store an operating system used by the apparatus.

4. The apparatus of claim 3, wherein the non-volatile memory stores sleep scan logic to enable the scanner module to capture the item image when the MPC system is in the sleep state.

5. The apparatus of claim 1, wherein the apparatus comprises a card and the connector comprises a port to be received by a slot of the MPC system.

6. The apparatus of claim 5, wherein the card comprises a PCMCIA card, the port comprises a PCMCIA port and the slot comprises a PCMCIA slot.

7. The apparatus of claim 1, wherein the paper feed tail further comprises:
ejection logic to eject the item subsequent to capture of the item image.

8. A mobile platform computer (MPC) system comprising:
a processor;
a chipset coupled to the processor, a battery and a primary display;
scanner logic coupled to the chipset, the scanner logic including a paper feed tail, the paper feed tail having a proximate end coupled to the scanner module and a distal end exposed on an exterior surface of the mobile platform computer system to receive the item and capture an item image; and
a database to store contact information identified from the item image captured by the scanner logic from the item received at the distal end of the paper feed tail; and
a secondary display to display the captured item image while the MPC system is in a sleep state if the MPC system is in the sleep state during the capture of the item image.

9. The mobile platform computer system of claim 8, wherein the scanner logic further comprises:
a scanner module coupled to the proximate end of the paper feed tail to receive the item fed from the proximate end of the paper feed tail to capture the item image.

10. The mobile platform computer system of claim 8, further comprising:
non-volatile memory, coupled to the chipset, wherein the non-volatile memory stores sleep scan logic to enable the scanner module to capture an item image when the MPC system is in a sleep state.

11. The mobile platform computer system of claim 8, wherein the scanner logic is directly mounted on the chipset of the mobile personal computer system.

12. The mobile platform computer system of claim 8, wherein scanner logic is embodied on a card to couple to a slot of the chipset.

13. A method comprising:
detecting, during a sleep state, insertion of an item within a paper feed tail exposed on an exterior surface of a mobile platform computer (MPC) system;
scanning the item to capture an item image;
displaying the captured item image on a secondary display while the MPC system is in the sleep state;
storing contact information from the captured item image within a database; and
resuming the sleep state.

14. The method of claim 13, wherein detecting insertion of the item further comprises:
enabling a scanner module coupled to the paper feed tail; and
capturing, by the scanner module, the item image.

15. The method of claim 13, wherein scanning the item further comprises:
identifying the item as a business card; and
extracting contact information from the business card.

16. The method of claim 13, wherein storing the item image further comprises:
extracting business, employee, address and telephone information from an item identified as a business card, as extracted information;
organizing the extracted information; and
generating one or more database entries to store the contact information.

17. The method of claim 13, further comprising:
ejecting the item once scanning of the item to capture the item image is complete.

18. An article of manufacture including a machine accessible medium having associated data, wherein the data, when accessed, results in the machine performing operations, comprising:
detecting, during a sleep state, insertion of an item within a paper feed tail exposed on an exterior surface of a mobile platform computer (MPC) system;
enabling a scanner device to scan the item and capture an item image;
displaying the captured item image on a secondary display while the MPC system is in the sleep state;
storing contact information from the item image within a database; and
disabling the scanner device to resume the sleep state.

19. The article of manufacture of claim 18, wherein the machine accessible medium further includes associated data, which when accessed, further results in the machine performing operations, comprising:
extracting business, employee, address and telephone information from an item identified as a business card, as extracted contact information;
formatting the extracted contact information; and
generating one or more database entries to store the extracted contact information.

20. The article of manufacture of claim 18, wherein the machine accessible medium further includes associated data, which when accessed, further results in the machine performing operations, comprising:
ejecting the item once scanning of the item to capture the item image is complete.

* * * * *